US011117191B2

(12) United States Patent
Bobel et al.

(10) Patent No.: US 11,117,191 B2
(45) Date of Patent: Sep. 14, 2021

(54) METHODS FOR MANUFACTURING CONNECTING ROD ASSEMBLIES AND CRANKSHAFT ASSEMBLIES

(71) Applicant: GM GLOBAL TECHNOLOGY OPERATIONS LLC, Detroit, MI (US)

(72) Inventors: Andrew C. Bobel, Clinton Township, MI (US); Tyson W. Brown, Royal Oak, MI (US); Whitney A. Poling, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 16/175,089

(22) Filed: Oct. 30, 2018

(65) Prior Publication Data
US 2020/0130060 A1    Apr. 30, 2020

(51) Int. Cl.
| | |
|---|---|
| *B22F 5/00* | (2006.01) |
| *F16C 7/02* | (2006.01) |
| *F16C 3/06* | (2006.01) |
| *B22F 10/20* | (2021.01) |
| *B33Y 80/00* | (2015.01) |
| *B33Y 10/00* | (2015.01) |

(52) U.S. Cl.
CPC .............. *B22F 5/008* (2013.01); *B22F 10/20* (2021.01); *F16C 3/06* (2013.01); *F16C 7/023* (2013.01); *B33Y 10/00* (2014.12); *B33Y 80/00* (2014.12); *F16C 2220/20* (2013.01)

(58) Field of Classification Search
CPC ........ B22F 3/1055; B22F 5/003; B22F 5/008; B22F 5/10; B22F 2999/00; B33Y 10/00; B33Y 80/00; F16C 2220/20; F16C 2220/80; F16C 2204/20; F16C 2204/42; F16C 2204/60; F16C 2240/60; F16C 3/06; F16C 7/023
See application file for complete search history.

(56) References Cited

U.S. PATENT DOCUMENTS

| | | | | |
|---|---|---|---|---|
| 8,979,971 | B2 * | 3/2015 | Schuster | B22F 7/08 75/10.13 |
| 2015/0053169 | A1 * | 2/2015 | Galli | F16C 7/023 123/197.3 |
| 2017/0282457 | A1 * | 10/2017 | Burns | B33Y 30/00 |

FOREIGN PATENT DOCUMENTS

DE    102011101857 A1    11/2012

* cited by examiner

*Primary Examiner* — Christopher J Besler
*Assistant Examiner* — Christine Bersabal
(74) *Attorney, Agent, or Firm* — Quinn IP Law

(57) ABSTRACT

A connecting rod comprises a shaft connecting a first end including a first bore with a second end including a second bore. Methods for forming and assembling a connecting rod and crankshaft assembly include fabricating the second end of the connecting rod via additive manufacturing such that the second end comprises a first and second weakened regions on opposing sides of the second bore, and breaking the second end of the connecting rod at the first and second weakened regions to form a connecting rod assembly comprising a second end base and a second end cap, wherein the base comprises a first fracture face and a second fracture face which each respectively correspond to a first fracture face and a second fracture face of the cap. The methods can further include mating the base and the cap such that a crankpin of a crankshaft is disposed within the second bore.

18 Claims, 5 Drawing Sheets

METHODS FOR MANUFACTURING CONNECTING ROD ASSEMBLIES AND CRANKSHAFT ASSEMBLIES

INTRODUCTION

The present disclosure relates to connecting rods, for example for use in internal combustion engines. Some internal combustion engines include a crankshaft, a plurality of pistons, and a plurality of connecting rods. Each of the connecting rods connects one of the pistons with the crankshaft.

SUMMARY

Provided are methods for manufacturing a connecting rod assembly, wherein a connecting rod can include a shaft connecting a first end including a first bore with a second end including a second bore. The method includes fabricating the second end of the connecting rod via additive manufacturing wherein a plurality of stacked metal layers are formed by selectively applying heat or energy to one or more metal precursors, and the additive manufacturing conditions are controlled such that the fabricated second end comprises a first weakened region and a second weakened region on opposing sides of the second bore; and breaking the second end of the connecting rod at each of the first and second weakened regions to form a connecting rod assembly comprising a second end base and a second end cap, wherein the base comprises a first fracture face and a second fracture face which each respectively correspond to a first fracture face and a second fracture face of the cap. The base first fracture face and base second fracture face can be matable with the cap first fracture face and the cap second fracture face, respectively. One or more of the base first fracture face, the base second fracture face, the cap first fracture face, and the cap second fracture face can be non-planar. The first and second weakened regions are 180 degrees apart. The first and second weakened regions can each have a higher porosity relative to the average porosity of the second end of the connecting rod. The second end of the connecting rod can include a plurality of metal phases, and the first and second weakened regions can have a higher concentration of one or more brittle metal phases relative to the average concentration of the one or more brittle metal phases throughout the second end of the connecting rod. The one or more metal precursors can include aluminum, steel, and/or titanium alloys. A laser can be used to selectively apply heat to the one or more metal precursors, and the first and/or second weakened regions can be formed by manipulating the laser exposure to over-expose the weakened region. A laser can be used to selectively apply heat to the one or more metal precursors, and the first and/or second weakened regions can be formed by manipulating the laser exposure to under-expose the weakened region such that unmelted or unconsolidated metal precursor powder is present in the weakened region.

Methods for forming and assembling a connecting rod and crankshaft assembly are also provided. A connecting rod can include a shaft connecting a first end including a first bore with a second end including a second bore. The method can include fabricating the second end of the connecting rod via additive manufacturing wherein a plurality of stacked metal layers are formed by selectively applying heat or energy to one or more metal precursors, and the additive manufacturing conditions are controlled such that the fabricated second end comprises a first weakened region and a second weakened region on opposing sides of the second bore, breaking the second end of the connecting rod at each of the first and second weakened regions to form a connecting rod assembly comprising a second end base and a second end cap, wherein the base comprises a first fracture face and a second fracture face which each respectively correspond to a first fracture face and a second fracture face of the cap, and mating the second end base and the second end cap such that a crankpin of a crankshaft is disposed within the second bore. Mating the second end base and the second end cap can include mating the base first fracture face with the cap first fracture face and mating the base second fracture face with the cap second fracture face. Mating can further include mechanically locking the cap to the base with one or more bolts. One or more of the base first fracture face, the base second fracture face, the cap first fracture face, and the cap second fracture face can be non-planar. The first and second weakened regions can be 180 degrees apart. The first and second weakened regions can each have a higher porosity relative to the average porosity of the second end of the connecting rod. The second end of the connecting rod can include a plurality of metal phases, and the first and second weakened regions can have a higher concentration of one or more brittle metal phases relative to the average concentration of the one or more brittle metal phases throughout the second end of the connecting rod. The one or more metal precursors can include aluminum, steel, and/or titanium alloys. A laser can be used to selectively apply heat to the one or more metal precursors, and the first and/or second weakened regions can be formed by manipulating the laser exposure to over-expose the weakened region. A laser can be used to selectively apply heat to the one or more metal precursors, and the first and/or second weakened regions can be formed by manipulating the laser exposure to under-expose the weakened region such that unmelted or unconsolidated metal precursor powder is present in the weakened region.

Methods for forming and assembling an automotive component assembly are also provided. An automotive component can include an end including a bore. The method can include fabricating the automotive component end via additive manufacturing wherein a plurality of stacked metal layers are formed by selectively applying heat or energy to one or more metal precursors, and the additive manufacturing conditions are controlled such that the fabricated end includes a first weakened region and a second weakened region on opposing sides of the bore, breaking the end of the automotive component at each of the first and second weakened regions to form an automotive component assembly including an end base and an end cap, wherein the base can include a first fracture face and a second fracture face which each respectively correspond to a first fracture face and a second fracture face of the cap, and mating the end base and the end cap such that an automotive member is disposed within the bore.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are for methods for manufacturing a connecting rod assembly, and methods for forming and assembling a connecting rod and crankshaft assembly. The methods utilize additive manufacturing to create intentional defects in the connecting rods, such that the connecting rods can be precisely broken into a cap and base which can be subsequently mated. The methods herein allow for connecting rods to be manufactured as a single piece, rather than two separate pieces, thereby reducing cost and eliminating the need for additional mating procedures such as surface machining.

Figure 1:
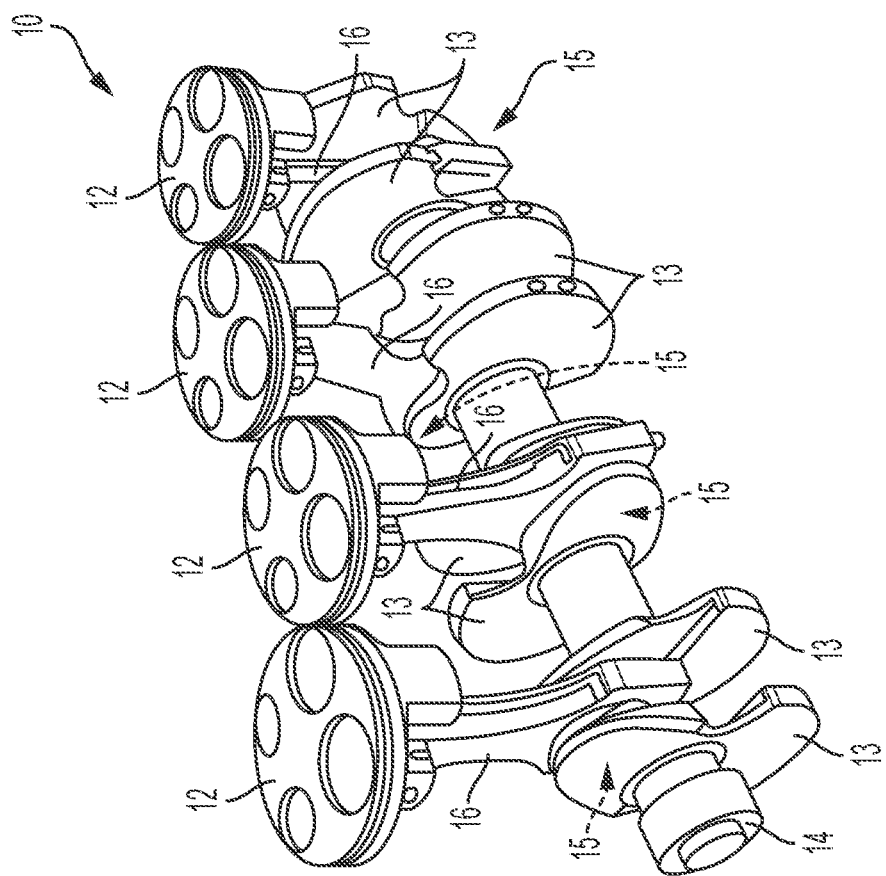
FIG. 1 illustrates a perspective view of a crank system of an internal combustion engine, according to one or more embodiments.

Referring to the figures, wherein like numerals indicate like or corresponding parts throughout the several views, FIG. 1 schematically illustrates part of a crank system of an internal combustion engine 10. The crank system of internal combustion engine 10 may include a plurality of pistons 12, a crankshaft 14, and a plurality of connecting rods 16. The crankshaft 14 comprises a plurality of pairs of throw arms 13, each connected by a crank pin 15 (obscured by throw arms 13 and connecting rods 16). Generally, each of the connecting rods 16 connects one of the pistons 12 to the crankshaft 14 via a respective crank pin 15. The below discussion generally refers to one connecting rod 16, but it is to be appreciated that any/all of the connecting rods 16 of the crank system of internal combustion engine 10 may be configured as discussed below. In addition, the methods described in this disclosure may also be used to make other linkages such as steering linkages, suspension linkages, shift linkages, bike components, etc.

The connecting rod 16 may be utilized in vehicle applications, or alternatively, the connecting rod 16 may be utilized in non-vehicle applications. Non-limiting examples of vehicle applications include a motor vehicle, marine vehicle, aerospace vehicle, robot, farm equipment, bicycles or other movable platform. Non-limiting examples of non-vehicle applications include a stationary power plant, machines, farm equipment, etc.

Figure 2:
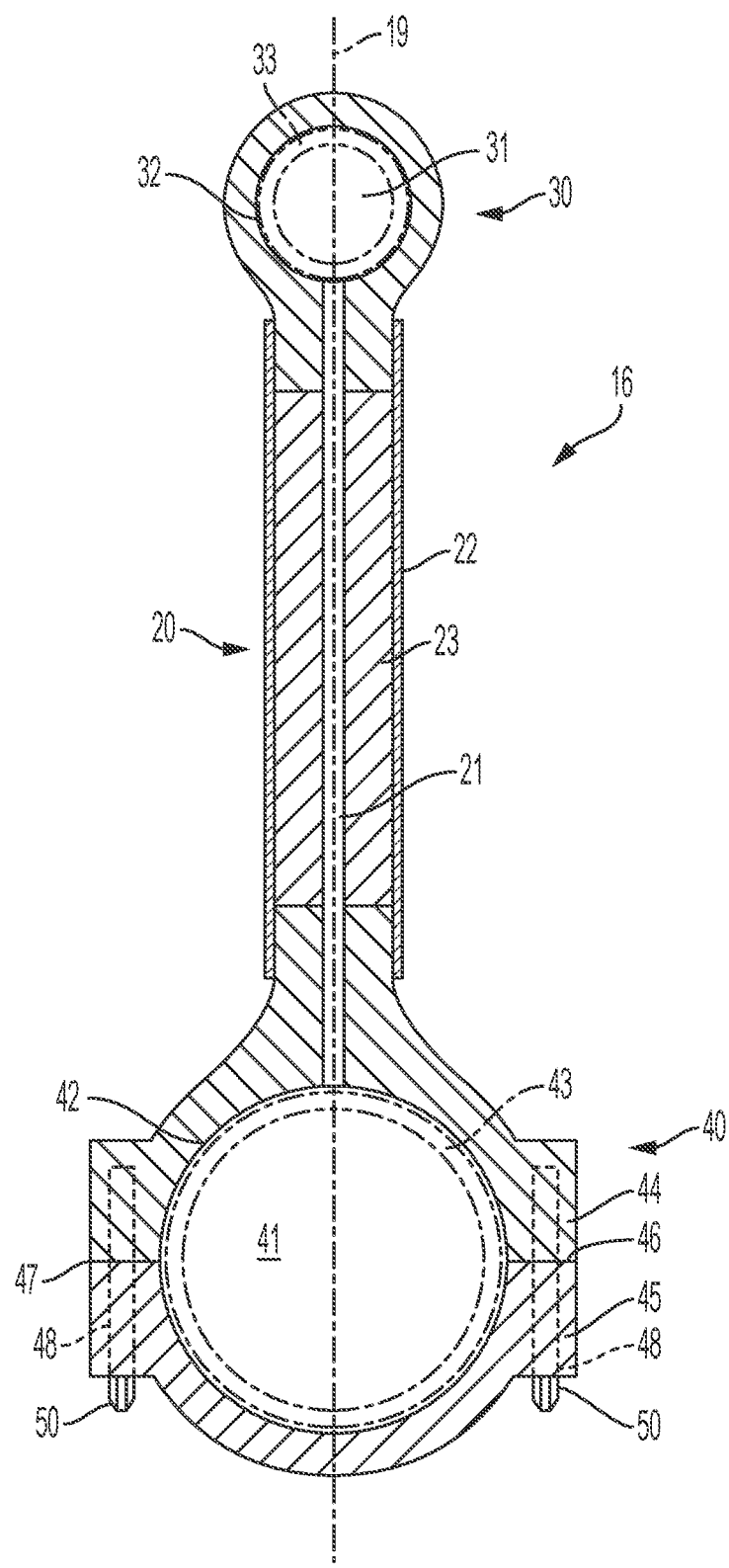
FIG. 2 illustrates a cross-sectional view of a connecting rod, according to one or more embodiments.

Referring to FIG. 2, the connecting rod 16 includes a shaft 20 extending along a shank axis 19 between a first rod end 30 and a second rod end 40. The shaft 20 can comprise features known in the art such as a channel 21. The one or more channels 21 in the connecting rod 16 described herein may be utilized to guide a fluid, such as a liquid, to lubricate and/or cool at least part of the connecting rod 16. Additionally, cooling at least part of the connecting rod 16 may improve durability and longevity of the connecting rod 16. The first rod end 30 comprises a first bore 31 defining a first inner surface 32 and the second rod end 40 comprises a second bore 41 defining a second inner surface 42. For example, the first bore 31 can be configured to pivotally connect the first end 30 to a piston 12 and the second bore 41 can be configured to pivotally connect the second end 40 to a crankshaft 14. In some embodiments, the connecting rod 16 can include a first bearing 33 disposed within the first bore 31 and a second bearing 43 disposed within the second bore 41; such bearings may assist with reducing friction between the first bore 31 and the second bore 41 and components mated therewith (e.g., the piston 12 and the crankshaft 14, respectively). In this configuration, the channel 21 may be utilized to deliver the fluid to the first and second bearings 33, 43 to lubricate and/or cool the first and second bearings 33, 43. In some embodiments, the first bearing 33 is contiguous with or secured to the first inner surface 32 within the first cavity 31, and the second bearing 43 is contiguous with or secured to the second inner surface 42 within the second cavity 41.

The connecting rod 16 may be formed of various materials. The second end 40 comprises a metal, or a metal alloy, as will be described below. The shaft 20 and the first end 30 can comprise the same metal or metal alloy, or different materials, as the second end 40 in various embodiments. FIG. 2 illustrates the shaft 20, the first end 30, and the second end 40 as comprising different materials of construction, but two or all of the same components may be formed as a one-piece construction, in some embodiments. For example, the shaft 20 and/or the first end 30 can comprise a composite material in some embodiments. In one embodiment, the shaft 20 can comprise an outer sheath 22 filled with a core 23. The outer sheath 22 can be utilized to couple the shaft 20 to the first end 30 and the second end 40, for example. The composite material can be a polymer composite. By utilizing two different types of materials (i.e., the first end 30 and the second end 40 being formed from metal or metal alloys and the shaft 20 being formed from a composite) the mass of the connecting rod 16 may be reduced while maximizing the stiffness of the connecting rod 16. Additionally, by reducing the mass of the connecting rod 16, fuel economy may be improved.

In a non-limiting example, polymer composites can comprise a fiber-reinforced composite that includes a matrix and a plurality of fibers embedded in the matrix. The matrix can include a resin wholly or partially comprising thermosets, epoxies, phenolic, polyurethanes, polyesters, bis-maleimides (BMIs), polyimides, benzoxazines, thermoplastics, polyamides, polyethylene, polypropylene, ceramics, metals, or a combination thereof. The fibers 68 may be wholly or partly made of carbon, basalt, glass, or polymeric materials such as aramids, and ultra-high-molecular-weight polyethylene (UHMPE), or combinations thereof.

The second end 40 is separable into a base 44 and a cap 45 at joints 46 and 47 such that the second end 40 can be mated with a component such as the crankshaft 14. The joints 46 and 47 are disposed 180 degrees apart about the circular second bore 41. The base 44 and the cap 45 can be separated and rejoined such that a component (e.g., the crankshaft 14) is disposed within the second bore 41. In some embodiments, the second end 40 can comprise bolt holes 48 and 49 which extend through both the base 44 and the cap 45 such that bolts 50 installed within bolt holes 48 and 49 may couple the base 44 and the cap 45. Other methods for coupling the base 44 and the cap 45 (e.g., welding) are known in the art and are within the scope of this disclosure.

The present disclosure also provides a method of manufacturing the connecting rod 16, and specifically the second end 40 of the connecting rod 16 by additive manufacturing (AM). AM is a process by which a solid three-dimensional metallic structure is built layer-by-layer, typically where energy or heat is selectively applied to starting materials or precursors (e.g., in the form of powders or wires) to melt, consolidate, solidify, fuse, or sinter and create a layer of solid material. AM is often referred to synonymously with three-dimensional printing. Metal precursors may be used to create solid component structures via AM. Non-limiting examples of AM processes include powder bed fusion processes (e.g., laser sintering, laser melting, electron beam melting and selective heat sintering), direct metal deposition, fused deposition modeling, blown powder processes (e.g., directed energy deposition), wire-fed directed energy deposition (e.g., wire extrusion processes), liquid metal 3D printing systems, ultrasonic consolidation (e.g., via an ultrasonic energy source), and binder jetting. Metal precursors can optionally include chemical or polymeric binders, in some embodiments.

A digital three-dimensional modeling system can be used to create a digital model of the component to be formed. The physical component can then be formed from the digital model by an AM system that creates solid fused structures in a layer-by-layer building process. The location and/or path that the heat source is applied to the metal precursors is defined by each respective cross-sectional layer of the three-dimensional product, for example as defined by the digital model thereof.

The application of heat to the metal precursor effects alloying, phases changes, and/or compositional changes thereto. For example, a metal precursor may include a mixture of unalloyed metals and the application of heat can produce an alloyed metal from the metal precursor. In other embodiments, the metal precursor may comprise one or more metals and a binder, and the application of heat thereto evaporates, burns, or otherwise transforms the binder such that a metal product is formed. In all AM processes, the intensity, application time, and/or application pattern of the heat source can be used to achieve particular material properties of the material layer formed from the metal precursor.

In the case of powder bed fusion AM, for example, a thin layer of the powdered material is spread over a powder bed, and the heat source is directed onto the powdered material to melt the powdered material where the laser is applied. The melted material solidifies, thereby forming a thin cross-sectional layer of a product. Another layer of the powdered material is spread over the previously formed layer, and the heat source is directed onto the powdered material to melt the powdered material and fuse it with the underlying layer where the laser is applied. The melted material solidifies, thereby forming a slightly thicker cross-sectional layer of the product. The process is repeated until the entire three-dimensional product is formed.

In the case of direct metal laser sintering, for example, a rapid high energy delivery method is used to directly melt metal powder in layers. After applying laser energy and locally melting the precursor material, the process is followed by rapid cooling, as the beam moves on to process contiguous precursor materials. DMLS provides local, rapid high energy deposition. Only a few milligrams of precursor material are heated at a given time (e.g., with a predetermined range of time, such as a few milliseconds (e.g., less than about 3-5 ms) of processing). The rapid cooling to underlying layers is typically a non-equilibrium process, and is designed to create large, directional thermal gradients and large local strain.

The metal precursors used in AM can include metals, such as aluminum alloys (e.g., Al10SiMg), titanium alloys (e.g., Ti-6Al-4V), and steel alloys, including automotive steels, stainless steels, and structural steels. Structural steels can include HSLA 420, 4140, 17-4 PH, and 15-5 PH, among others. In general, the methods provided herein may utilize any suitable metal precursors as would be identified as suitable by one of skill in the art.

Figure 3:
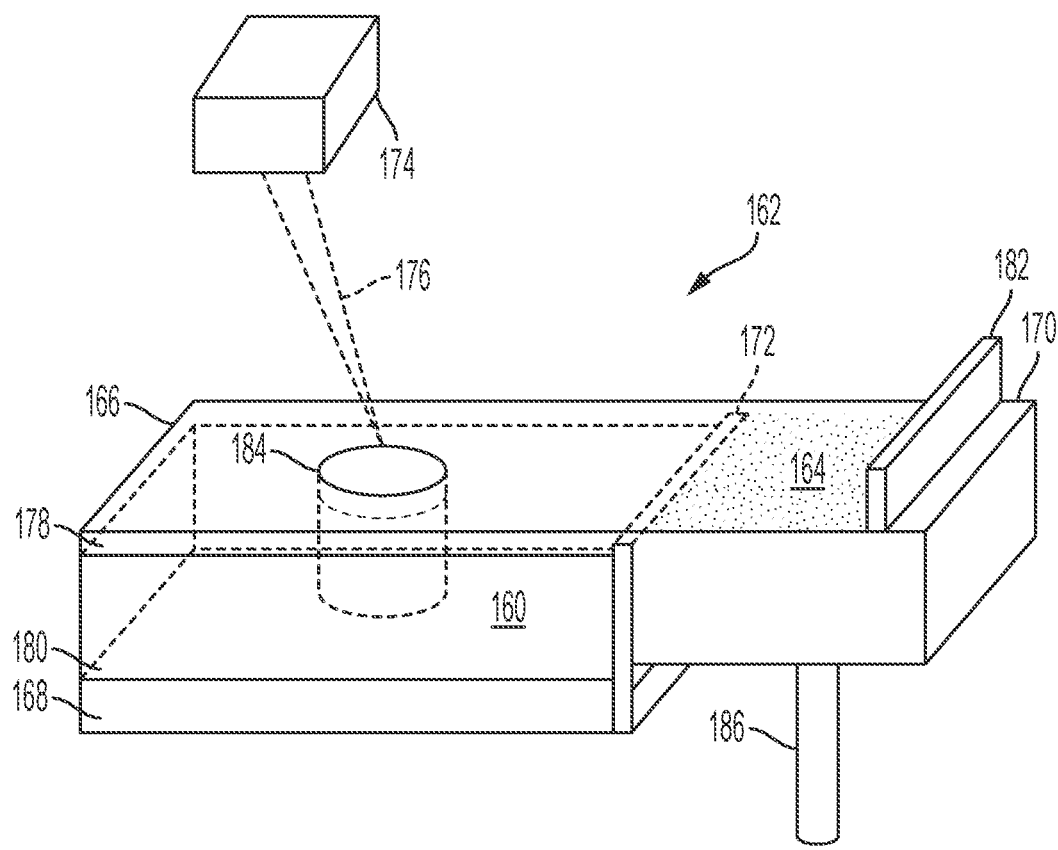
FIG. 3 illustrates a perspective schematic view of a powder bed fusion process used to fabricate metal articles, according to one or more embodiments.

In a non-limiting example of AM, an illustration of a powder bed fusion process for fabricating a metal article 160 is shown in FIG. 3 as an example of a suitable AM approach. Metal alloy article 160 can comprise the connecting rod 16, or at least the second end 40 of the connecting rod 16. A powder bed fusion apparatus 162 is shown that can be used to build the three-dimensional metal alloy article 160 layer by layer (e.g., microlayer by microlayer) from a powder collection 164 comprising various metal precursors described herein or known in the art. The powder bed fusion apparatus 162 includes a printing chamber 166 that surrounds a build plate 168, a powder feed reservoir 170 separated from the printing chamber by a weir 172 that contains the powder collection 164, and an energy source 174 that can direct a concentrated energy beam 176 such as a laser beam (SLS, SLM) or an electron beam (EBM). The powder of the metal precursor can include metal or alloy particles having a particle size as measured along the largest dimension of the particles that ranges from about 5 µm to about 60 µm, for example.

The powder bed fusion process involves repeatedly performing a microlayer fusion cycle. This cycle involves first spreading a powder layer 178 of the metal precursor powder over a build surface 180 of the build plate 168. After successive microlayer fusion cycles, build surface 180 accumulates unfused powder metal precursor. This can be accomplished by sliding the blade 182 through the powder feed reservoir 170 and across the build plate 168 to deposit the powder layer 178 directly onto the build surface 180 or onto a portion of the article 160 (as shown) that is being built onto and upwardly from the build surface 180. The deposited powder layer 178 has a thickness that is generally the same as the microlayers being fused together during the building of the metal alloy article 160. For example, the thickness can range from 5 µm to 100 µm, or from 10 µm to 50 µm. Next, after the powder layer 178 has been deposited, the concentrated energy beam 176 scans a pattern (e.g., a two-dimensional pattern) projected onto the powder layer 178 to sinter or melt a predetermined portion 184 of the powder layer 178 that corresponds to the cross-sectional slice of the metal alloy part 160 being formed and added during the cycle. After the concentrated energy beam 176 is finished scanning the powder layer 178, the sintered or melted portion 184 of the powder layer 178 rapidly cools and solidifies into a fused microlayer, thereby completing the microlayer fusion cycle.

The microlayer fusion cycle is repeated many times—often on the order of hundreds to thousands to tens of thousands of times—to build the metal alloy article 160 onto the build surface 180 of the build plate 168. The first microlayer fusion cycle forms the first microlayer of the metal alloy part 160 and each successively completed microlayer fusion cycle fuses another, single microlayer onto the previously fused microlayer until the article is fully fabricated. To accommodate the deposition of successive powder layers 178 and the growing metal alloy article 160, the powder feed reservoir 170 may be equipped with a dosing piston 186 that incrementally raises the reservoir 170 after each microlayer fusion cycle relative to the printing chamber 166 so that the next powder layer 178 can be deposited over the fused microlayer obtained from the previously-deposited powder layer 178. After the metal alloy article 160 is fully fabricated in the printing chamber 166, the article is removed from the surrounding excess powder. The article 160, which is now a shaped monolith constructed from the metal precursor, may optionally be subjected to additional treatments, such as the heat treatment processes. For example, the metal alloy article can be annealed to relieve residual thermal stresses prior to the heat treatment process, particularly to mitigate any undesired results of rapid cooling rates which may occur during AM.

Figure 4:
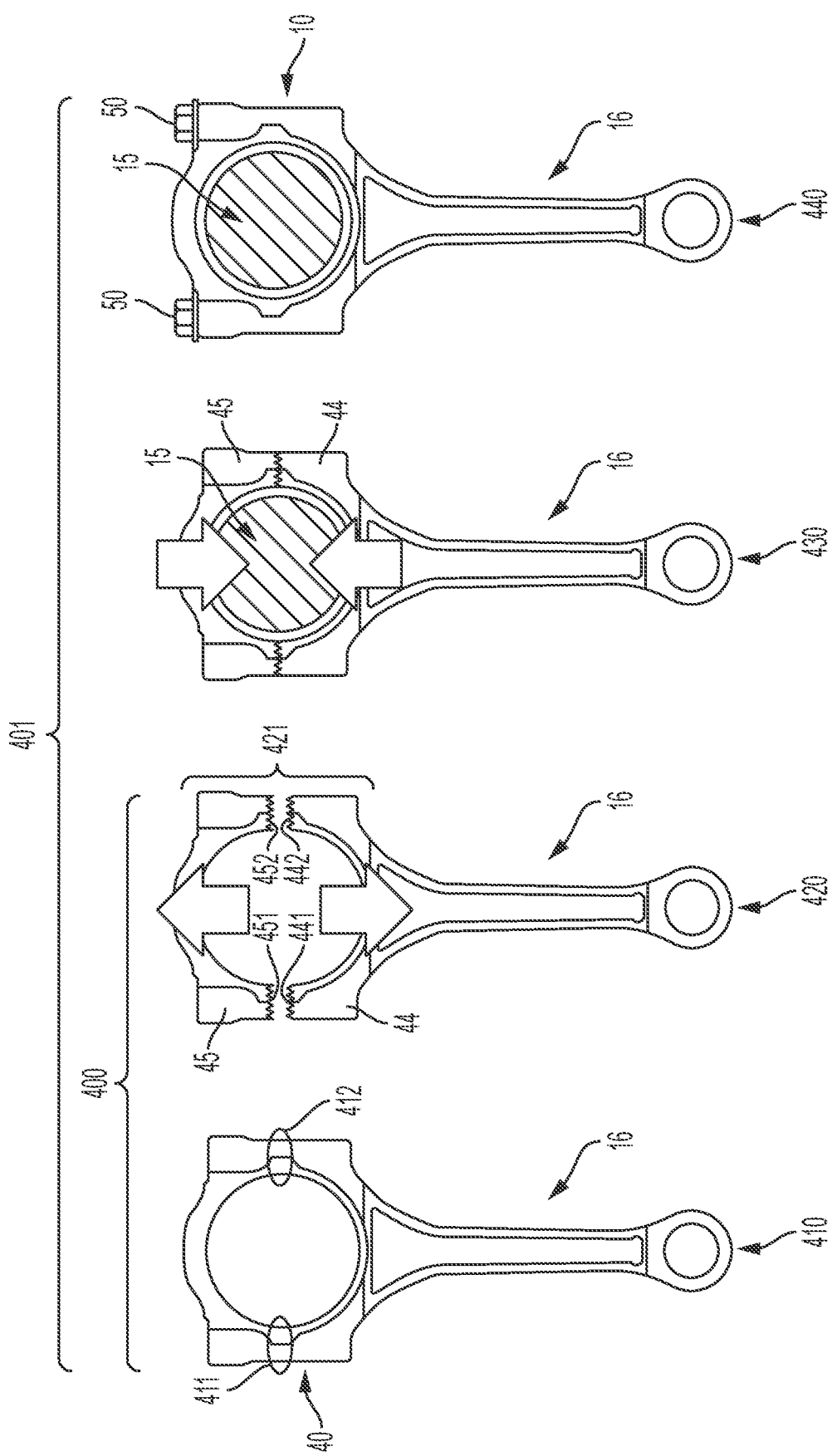
FIG. 4 illustrates a schematic view of methods for manufacturing a connecting rod assembly and forming and assembling a connecting rod and crankshaft assembly, according to one or more embodiments.
Figure 5:
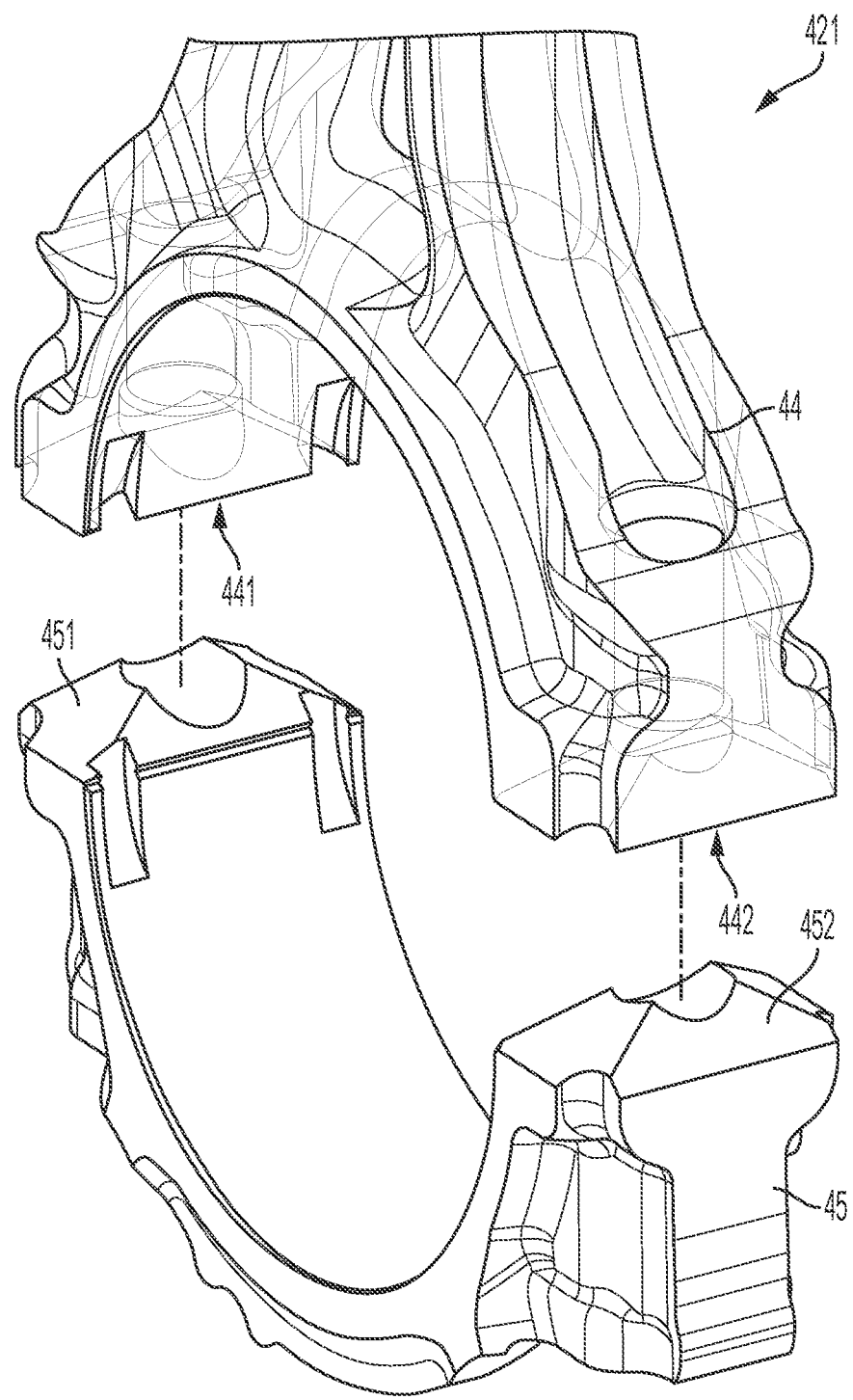
FIG. 5 illustrates a perspective view of a connecting rod assembly, according to one or more embodiments.

FIG. 4 illustrates a method 400 for manufacturing a connecting rod assembly 421, comprising fabricating 410 the second end 40 of the connecting rod 16 via AM such that the fabricated 410 second end 40 comprises two weakened regions 411, 412 on opposing sides of the second bore 41 of the connecting rod 16, breaking 420 the second end 40 of the connecting rod 16 at each of the two weakened regions 411, 412 to form a connecting rod assembly 421 comprising the base 44 at the second end 40 and the cap 45 at the second end 40, wherein the base 44 comprises a first fracture face 441 and a second fracture face 442, which each respectively correspond to a first fracture face 451 and a second fracture face 452 of the cap 45. Method 400 comprises fabricating 410 at least the second end 40 of the connecting rod 16 via AM, and other aspects of the connecting rod 16 (e.g., the first end 40, and/or the shaft 20) may additionally be formed via AM. The two weakened regions 411, 412 can be disposed 180 degrees apart to facilitate mating the connecting rod assembly 421 with various bodies, as will be described below. The first fracture face 441 of the base 44 and the second fracture face 442 of the base 44 are matable with the first fracture face 451 of the cap 45 and the second fracture face 452 of the cap 45, respectively. The base first fracture face 441 of the base 44, the base second fracture face 442 of the base 44, the first fracture face 451 of the cap 45, and the second fracture face 452 of the cap 45 can have varying face geometries, including planar geometries and non-planar geometries. For example, FIG. 5 illustrates a perspective view of a connecting rod assembly 421 wherein the first fracture face 441 of the base 44 and the second fracture face 442 of the base 44 are generally concave and the first fracture face 451 of the cap 45 and the second fracture face 452 of the cap 45 are generally convex.

The two weakened regions 411,412 are formed during AM such that the second end 40 can be broken 420 in two predetermined locations, and optionally with desired geometries of one or more of the first fracture face 441 of the base 44, the second fracture face 442 of the base 44, the first fracture face 451 of the cap 45, and the second fracture face 452 of the cap 45. In one embodiment, when a laser is used during AM to selectively apply heat to the one or more metal precursors, the first and/or second weakened regions 411, 412 can be formed by manipulating the laser exposure to over-expose the weakened region(s) 411, 412. In such an embodiment, over-exposing a region can cause metal evaporation and create a region of increased porosity. An area of increased porosity will generally be more brittle than a region of similar material with lower porosity. Specifically, one or both of the two weakened regions 411,412 can each comprise a higher porosity relative to the average porosity of the second end 40 of the connecting rod 16. In another embodiment, when a laser is used during AM to selectively apply heat to the one or more metal precursors, the first and/or second weakened regions 411, 412 can be formed by manipulating the laser exposure to under-expose the weakened region such that unmelted or unconsolidated metal precursor powder is present in the weakened region(s) 411, 412. An area comprising unmelted or unconsolidated metal precursor will generally be more brittle than a region of similar material less, or no, unmelted or unconsolidated metal precursor. Laser exposure can be manipulated by one or more of manipulating the laser intensity, or manipulating the laser pattern, for example. The laser intensity can be decreased to effect an under-exposed result, and the laser intensity can be increased to effect an over-exposed result. The laser pattern can be altered to provide less or no laser exposure in a given area of metal precursor to effect an under-exposed result. Similarly, the laser pattern can be altered to provide multiple laser passes in a given area of metal precursor to effect an over-exposed result. In some embodiments, the second end 40 of the connecting rod 16 comprises a plurality of metal phases, and the two weakened regions 411, 412 comprise a higher concentration of one or more brittle metal phases relative to the average concentration of the brittle metal phase throughout the second end 40 of the connecting rod 16. Such brittle metal phases can be formed during AM by varying operating parameters, such as the laser intensity or laser pattern.

FIG. 4 also illustrates a method 401 for forming and assembling an automotive component. Method 401 will be described in relation to the connecting rod 16 and the crankshaft 14 assembly for the sake of illustration only, and one of skill the in the art will recognize that method 401 also can be utilized for forming and assembling automotive components and assemblies comprising the same. Method 401 comprises fabricating 410 the second end 40 of the connecting rod 16 via AM such that the fabricated 410 second end 40 comprises two weakened regions 411, 412 on opposing sides of the second bore 41 of the connecting rod 16, breaking 420 the second end 40 of the connecting rod 16 at each of the two weakened regions 411, 412 to form the connecting rod assembly 421 described above, and mating 430 the base 44 at the second end 40 and the cap 45 at the second end 40 such that a crankpin 15 of a crankshaft 14 is disposed within the second bore 41. Accordingly, method 401 can comprise fabricating 410 an automotive component (illustrated as the connecting rod 16 in FIG. 4) end (illustrated as the second end 40 in FIG. 4) via AM, such that the automotive end comprises a bore, and the fabricated end comprises a first weakened region 411 and a second weakened region 412 on opposing sides of the bore, breaking the end of the automotive component at each of the first and second weakened regions 411, 412 to form an automotive component assembly comprising an end of the base 44 and an end of the cap 45, wherein the base 44 comprises a first fracture face 441 and a second fracture face 442 which each respectively correspond to a first fracture face 451 of the cap 45 and a second fracture face 452 of the cap 45; and mating the end of the base 44 and the end of the cap 45 such that an automotive member (illustrated as crankpin 15 in FIG. 4) is disposed within the bore. In some embodiments, the automotive member comprises a rotary bearing housing, and the automotive member comprises a shaft.

Mating 430 the base 44 and the cap 45 can comprise mating the first fracture face 441 of the base 44 with the first fracture face 451 of the cap 45 and mating the second fracture face 442 of the base 44 with the second fracture face 452 of the cap 45. Method 401 can further optionally comprise mechanically locking 440 the base 44 to the cap 45 (i.e., mechanically locking the first fracture face 441 of the base 44 with the first fracture face 451 of the cap 45 and mechanically locking the second fracture face 442 of the base 44 with the second fracture face 452 of the cap 45). Mechanical locking features can include bolts 50 (as illustrated in FIGS. 2 and 4), or other features (not pictured) including pins, screws, threads, knurling, dovetails, and clips. In one example, mechanically locking 440 the base 44 to the cap 45 provides a crank system of internal combustion engine 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for manufacturing a connecting rod assembly, wherein a connecting rod comprises a shaft connecting a first end including a first bore with a second end including a second bore, the method comprising:
   fabricating the second end of the connecting rod via additive manufacturing wherein a plurality of stacked metal layers are formed by selectively applying heat or energy to one or more metal precursors which includes a metal wire precursor, and the additive manufacturing conditions are controlled such that the fabricated second end comprises a first weakened region and a second weakened region on opposing sides of the second bore;
   breaking the second end of the connecting rod at each of the first and second weakened regions to form the connecting rod assembly comprising a base having a second end base and a cap having a second end cap, wherein the base comprises a first fracture face and a second fracture face which each respectively correspond to a first fracture face of the cap and a second fracture face of the cap;
   wherein the first fracture face of the base, the second fracture face of the base, the first fracture face of the cap, and the second fracture face of the cap are each a non-planar configuration; and
   wherein the non-planar configurations of the first fracture face of the base and the second fracture face of the base are concave or convex, and the non-planar configurations of the first fracture face of the cap and the second fracture face of the cap are the other one of concave or convex to mate with the non-planar configurations of the first fracture face of the base and the second fracture face of the base respectively.

2. The method of claim 1, wherein the first fracture face of the base and the second fracture face of the base are matable with the first fracture face of the cap and the second fracture face of the cap, respectively.

3. The method of claim 1, wherein the first and second weakened regions are 180 degrees apart.

4. The method of claim 1, wherein the first and second weakened regions each comprise a higher porosity relative to an average porosity of the second end of the connecting rod.

5. The method of claim 1, wherein the second end of the connecting rod comprises a plurality of metal phases, and the first and second weakened regions comprise a higher concentration of one or more brittle metal phases relative to an average concentration of the one or more brittle metal phases throughout the second end of the connecting rod.

6. The method of claim 1, wherein the one or more metal precursors comprise aluminum, steel, and/or titanium alloys.

7. The method of claim 1, wherein a laser is used to selectively apply heat to the one or more metal precursors, and the first and/or second weakened regions are formed by manipulating the laser to over-expose the first and/or second weakened regions.

8. The method of claim 1, wherein a laser is used to selectively apply heat to the one or more metal precursors, and the first and/or second weakened regions are formed by manipulating the laser to under-expose the first and/or second weakened regions such that unmelted or unconsolidated metal precursor powder is present in the first and/or second weakened regions.

9. A method for forming and assembling a connecting rod assembly and a crankshaft assembly, wherein a connecting rod comprises a shaft connecting a first end including a first bore with a second end including a second bore, the method comprising:
   fabricating the second end of the connecting rod via additive manufacturing wherein a plurality of stacked metal layers are formed by selectively applying heat or energy to one or more metal precursors which includes a metal wire precursor, and the additive manufacturing conditions are controlled such that the fabricated second end comprises a first weakened region and a second weakened region on opposing sides of the second bore;
   breaking the second end of the connecting rod at each of the first and second weakened regions to form the connecting rod assembly comprising a base having a second end base and a cap having a second end cap, wherein the base comprises a first fracture face and a second fracture face which each respectively correspond to a first fracture face of the cap and a second fracture face of the cap, and wherein the first fracture face of the base, the second fracture face of the base, the first fracture face of the cap, and the second fracture face of the cap are each a non-planar configuration;

mating the second end base and the second end cap such that a crankpin of a crankshaft is disposed within the second bore; and wherein the non-planar configurations of the first fracture face of the base and the second fracture face of the base are concave or convex, and the non-planar configurations of the first fracture face of the cap and the second fracture face of the cap are the other one of concave or convex to mate with the non-planar configurations of the first fracture face of the base and the second fracture face of the base respectively.

10. The method of claim 9, wherein mating the second end base and the second end cap comprises mating the first fracture face of the base with the first fracture face of the cap and mating the second fracture face of the base with the second fracture face of the cap.

11. The method of claim 10, wherein mating further comprises mechanically locking the cap to the base with one or more bolts.

12. The method of claim 9, wherein the first and second weakened regions are 180 degrees apart.

13. The method of claim 9, wherein the first and second weakened regions each comprise a higher porosity relative to an average porosity of the second end of the connecting rod.

14. The method of claim 9, wherein the second end of the connecting rod comprises a plurality of metal phases, and the first and second weakened regions comprise a higher concentration of one or more brittle metal phases relative to an average concentration of the one or more brittle metal phases throughout the second end of the connecting rod.

15. The method of claim 9, wherein the one or more metal precursors comprise aluminum, steel, and/or titanium alloys.

16. The method of claim 9, wherein a laser is used to selectively apply heat to the one or more metal precursors, and the first and/or second weakened regions are formed by manipulating the laser to over-expose the first and/or second weakened regions.

17. The method of claim 9, wherein a laser is used to selectively apply heat to the one or more metal precursors, and the first and/or second weakened regions are formed by manipulating the laser to under-expose the first and/or second weakened regions such that unmelted or unconsolidated metal precursor powder is present in the first and/or second weakened regions.

18. A method for forming and assembling an automotive component assembly, wherein an automotive component comprises an end including a bore, the method comprising:

fabricating the end of the automotive component via additive manufacturing wherein a plurality of stacked metal layers are formed by selectively applying heat or energy to one or more metal precursors which includes a metal wire precursor, and the additive manufacturing conditions are controlled such that the fabricated end comprises a first weakened region and a second weakened region on opposing sides of the bore;

breaking the end of the automotive component at each of the first and second weakened regions to form the automotive component assembly comprising a base having an end base and a cap having an end cap, wherein the base comprises a first fracture face and a second fracture face which each respectively correspond to a first fracture face of the cap and a second fracture face of the cap, and wherein the first fracture face of the base, the second fracture face of the base, the first fracture face of the cap, and the second fracture face of the cap are each a non-planar configuration;

mating the end base and the end cap such that an automotive member is disposed within the bore; and wherein the non-planar configurations of the first fracture face of the base and the second fracture face of the base are concave or convex, and the non-planar configurations of the first fracture face of the cap and the second fracture face of the cap are the other one of concave or convex to mate with the non-planar configurations of the first fracture face of the base and the second fracture face of the base respectively.

\* \* \* \* \*